(12) United States Patent
Seidler et al.

(10) Patent No.: US 8,985,839 B2
(45) Date of Patent: Mar. 24, 2015

(54) STAND MIXER ARRANGEMENT WITH GUARDING DEVICE

(75) Inventors: Mark Seidler, Havant (GB); Keith Leaman, Havant (GB)

(73) Assignee: Kenwood Limited, Hampshire (GB)

( * ) Notice: Subject to any disclaimer, the term of this patent is extended or adjusted under 35 U.S.C. 154(b) by 1192 days.

(21) Appl. No.: 12/936,596

(22) PCT Filed: Apr. 15, 2009

(86) PCT No.: PCT/GB2009/050367
§ 371 (c)(1),
(2), (4) Date: Nov. 1, 2010

(87) PCT Pub. No.: WO2009/127866
PCT Pub. Date: Oct. 22, 2009

(65) Prior Publication Data
US 2011/0063941 A1    Mar. 17, 2011

(30) Foreign Application Priority Data

Apr. 19, 2008  (GB) .................................. 0807184.7

(51) Int. Cl.
*B01F 7/30*     (2006.01)
*B01F 15/00*    (2006.01)
(Continued)

(52) U.S. Cl.
CPC .............. *A47J 43/0705* (2013.01); *A47J 36/06* (2013.01); *A47J 43/0727* (2013.01)
USPC .......................................... 366/146; 366/347

(58) Field of Classification Search
CPC .............. B01F 7/14; B01F 7/145; B01F 7/30; B01F 7/302; B01F 7/305; B01F 7/307; B01F 15/00967
USPC ............. 366/144–148, 197–207, 347; 99/348
See application file for complete search history.

(56) References Cited

U.S. PATENT DOCUMENTS 555,601 A    3/1896  Fiedler
2,014,734 A * 9/1935  Hoe ............................ 366/197
(Continued)

FOREIGN PATENT DOCUMENTS

EP   1430824 A1   6/2004
GB   2255608 A    11/1992
GB   2435434 A    8/2007

OTHER PUBLICATIONS

British Search Report for GB0807184.7 filed Apr. 19, 2004, 2008, date of search Aug. 14, 2008.
(Continued)

*Primary Examiner* — Charles Cooley
(74) *Attorney, Agent, or Firm* — Paul D. Bianco; Martin Fleit; Fleit Gibbons Gutman Bongini & Bianco PL (57) ABSTRACT

A stand mixer (10) capable of subjecting ingredients in a bowl (60) to a planetary mixing action, and which is also provided with the capability of heating the ingredients, is further provided with a guarding device (70, 80) to reduce unwanted egress of steam and/or to prevent ingredients being ejected from the bowl (60). The guarding device comprises a first component (70) which is removably attachable to the stand mixer (10) in the vicinity of its planetary drive outlet (44) and a second component (80) which is removably attachable to the first component (70) and also to the bowl (60). The first component (70) is shaped and configured to shield part of the stand mixer (10) from heat and the second component (80) is designed to resist unwanted egress of steam and/or to prevent ingredients being ejected from the bowl. A user is thus provided with the flexibility of operating the stand mixer with just the first component (70) in place as a heat shield, thereby leaving the bowl (60) open so that steam can escape, or operating the stand mixer (10) with both components (70, 80) in place, in which case the bowl (60) is effectively covered.

11 Claims, 8 Drawing Sheets

(51) Int. Cl.
*A47J 43/07* (2006.01)
*A47J 36/06* (2006.01)

(56) References Cited

U.S. PATENT DOCUMENTS

| | | | | |
|---|---|---|---|---|
| 2,046,784 A | * | 7/1936 | Krause | 219/209 |
| 4,900,160 A | * | 2/1990 | Brooks et al. | 366/347 |
| 5,207,506 A | * | 5/1993 | Musseau et al. | 366/95 |
| 5,306,083 A | * | 4/1994 | Caldwell et al. | 366/347 |
| 5,348,393 A | * | 9/1994 | Pappas, Jr. | 366/207 |
| D371,275 S | * | 7/1996 | Fouquet | D7/379 |
| 5,533,806 A | * | 7/1996 | Veltrop et al. | 366/347 |
| 5,556,201 A | | 9/1996 | Veltrop et al. | |
| 5,660,469 A | * | 8/1997 | Seguin | 366/347 |
| 5,934,802 A | * | 8/1999 | Xie | 366/100 |
| 6,062,725 A | * | 5/2000 | Paturel et al. | 366/347 |
| 6,068,398 A | * | 5/2000 | Lin | 366/347 |
| 6,435,708 B1 | * | 8/2002 | Huang | 366/347 |
| 6,827,481 B2 | * | 12/2004 | Yoshioka | 366/347 |
| 7,354,192 B2 | * | 4/2008 | Jejcic | 366/347 |
| 7,384,187 B2 | * | 6/2008 | Blackburn et al. | 366/206 |
| D582,203 S | * | 12/2008 | Short et al. | D7/376 |
| D583,189 S | * | 12/2008 | Short et al. | D7/376 |
| D583,617 S | * | 12/2008 | Short et al. | D7/376 |
| D583,618 S | * | 12/2008 | Blackburn et al. | D7/376 |
| 7,543,980 B2 | * | 6/2009 | Blackburn et al. | 366/206 |
| 8,147,126 B2 | * | 4/2012 | Huang | 366/347 |
| 8,308,344 B2 | * | 11/2012 | Short et al. | 366/347 |
| 8,348,186 B2 | * | 1/2013 | Seidler et al. | 241/36 |
| D683,578 S | * | 6/2013 | Nordwall | D7/379 |
| 2002/0181322 A1 | * | 12/2002 | Brunswick et al. | 366/197 |
| 2004/0022124 A1 | * | 2/2004 | Yoshioka | 366/347 |
| 2005/0122835 A1 | * | 6/2005 | Nussbaum | 366/183.1 |
| 2006/0227654 A1 | * | 10/2006 | Blackburn et al. | 366/206 |
| 2007/0133343 A1 | * | 6/2007 | Jejcic | 366/144 |
| 2010/0188928 A1 | * | 7/2010 | Huang | 366/347 |
| 2011/0063941 A1 | * | 3/2011 | Seidler et al. | 366/145 |
| 2011/0122723 A1 | * | 5/2011 | Saubert | 366/200 |
| 2011/0186668 A1 | * | 8/2011 | Seidler et al. | 241/98 |
| 2012/0170404 A1 | * | 7/2012 | Drees et al. | 366/204 |

OTHER PUBLICATIONS

International Search Report for PCT/GB2009/050367 filed Apr. 15, 2009 mailed Oct. 7, 2009.
Written Opinion of the International Searching Authority for PCT/GB2009/050367 filed Apr. 15, 2009 mailed Oct. 7, 2009.

* cited by examiner

STAND MIXER ARRANGEMENT WITH GUARDING DEVICE

FIELD OF THE INVENTION

This invention relates to arrangements including stand mixers, by which is meant the kind of kitchen machine in which a mixing bowl is supported on a pedestal which also supports an electric motor and a drive system including a drive outlet, overhead of the bowl, which permits a planetary mixing action to be imparted to tools suspended into the bowl from the overhead drive outlet.

BACKGROUND OF THE INVENTION

Stand mixers, such as the Kenwood Chef kitchen machine, are well known and have been well established in use for many years. Over the years, mixers of this kind have been adapted and developed so as to perform an ever broadening range of functions, and many such devices incorporate, for example, a plurality of selectively usable drive outlets capable of running at different speeds and having differing torque characteristics, thus enabling them to perform a wide spread of operations.

Recent technical developments have provided stand mixers with a still broader operational capability, as it has been proposed to incorporate heating arrangements into such machines, thereby to enable foodstuffs to be heated whilst being stirred or mixed by the normal planetary mixing action of the stand mixer. Of course, the heating arrangements can be used or not, according to user requirements, and it will also be appreciated that the heating temperature and the heating time are both controllable, enabling the user to apply any desired degree of heating; for example sufficient to completely cook, to partially cook, or to merely warm ingredients.

In preferred embodiments, the heating means is incorporated into the stand mixer, though it is possible for a heater to be incorporated into a bowl or other receptacle containing the ingredients, or for a heater to be incorporated into a heating pad which is separate from both the bowl and the stand mixer, but may be temporarily associated with them, for example by being interposed between the two, when required to perform a heating function.

SUMMARY OF THE INVENTION

In any event, it is desirable to provide a guarding device to reduce unwanted egress of steam and/or to prevent ingredients being ejected from the bowl or other receptacle in which they are being heated and/or stirred. Considerable demands are placed upon such guarding devices, and it is an object of this invention to provide a stand mixer with a guarding device capable of addressing several such demands.

According to the invention, there is provided a stand mixer arrangement including a pedestal for a mixing bowl; an electric motor and a drive system including a drive outlet disposed overhead of the bowl, capable of imparting a planetary mixing action to a tool suspended into the bowl therefrom; and heating means provided to permit, in accordance with user selection, ingredients in the bowl to be heated whilst being subjected to the planetary mixing action; the arrangement further including a guarding device for said bowl and wherein the guarding device comprises a first component removably attachable to the stand mixer in the vicinity of said drive outlet and surrounding said drive outlet and a second component removably attachable to the first component; said first component being adapted to shield part of the stand mixer from heat and said second component being adapted to resist unwanted egress of steam and/or to prevent ingredients being ejected from the bowl. By this means, the user is provided with the flexibility of having just the first component in place as a heat shield, leaving the bowl open so that steam can escape therefrom, or having both components in place, in which case the bowl is effectively covered.

Preferably the first component is shaped and dimensioned to provide an interference fit to a downwardly-dependant part of the stand mixer overlying the bowl. It is further preferred that the interference fit is augmented by a steam-resistant seal carried by the first component.

It is preferred that the second component is provided with a closable aperture through which ingredients may be added without the need to remove the second component, and it is further preferred, in some embodiments, that the second component is provided with a vent for the controlled egress of steam.

It is particularly preferred that the surface of the second component exposed to the bowl is configured to encourage condensate to flow back into the bowl.

The bowl may conveniently be made of metal, and may conform to existing stand mixer design and shape criteria, so as to be capable of using conventional mixing tools.

The bowl, or at least some part or parts thereof, may be constructed of a sandwich of materials in order to assist thermal transfer to the ingredients therein. For example, part at least of the bowl may be constructed with inner and outer stainless steel walls and/or base, with an interlayer of aluminium therebetween.

The stand mixer may be fitted with a scraping tool, attachable to its gearbox hub and constrained to revolve more slowly than the planetary-acting mixing tools; the scraping tool being configured to remove ingredients from the walls of the bowl in order to reduce the risk of burning or overheating of adherent materials.

The heating means may comprise a sheathed resistance element, a thick film heater, an inductive heater or a halogen heater, for example, or combinations of these.

It is preferred that an interlock is provided whereby the heating means is not energisable unless at least the first component of the guarding device is in place on the stand mixer.

The bowl may engage with the pedestal by means of a conventional screw or bayonet fixing.

BRIEF DESCRIPTION OF THE DRAWINGS

In order that the invention may be clearly understood and readily carried into effect, certain embodiments thereof will now be described, by way of example only, with reference to the accompanying drawings, of which.

DETAILED DESCRIPTION OF THE INVENTION

Figure 1:
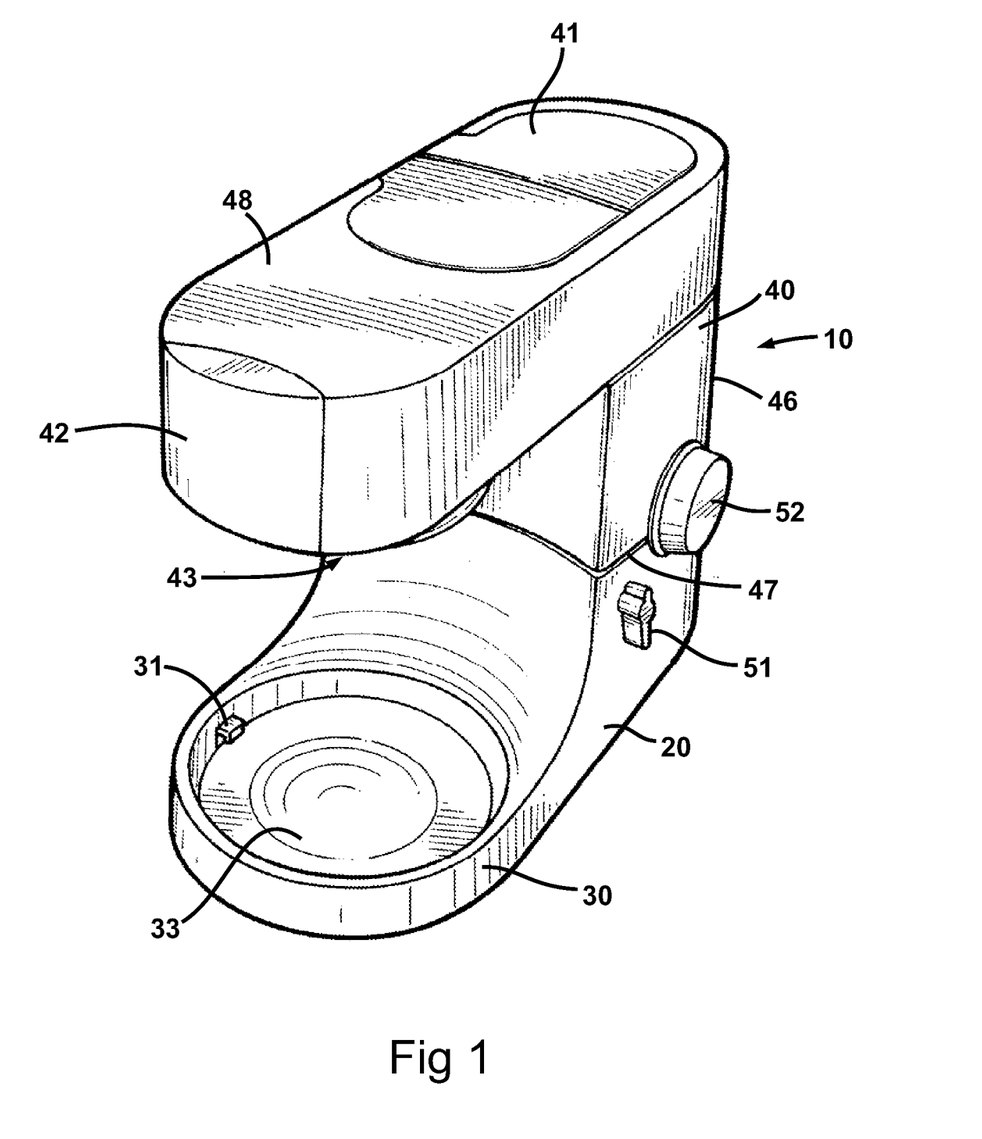
FIG. 1 shows, in perspective view, one example of a stand mixer suitable for use in the arrangement of the invention.
Figure 2:
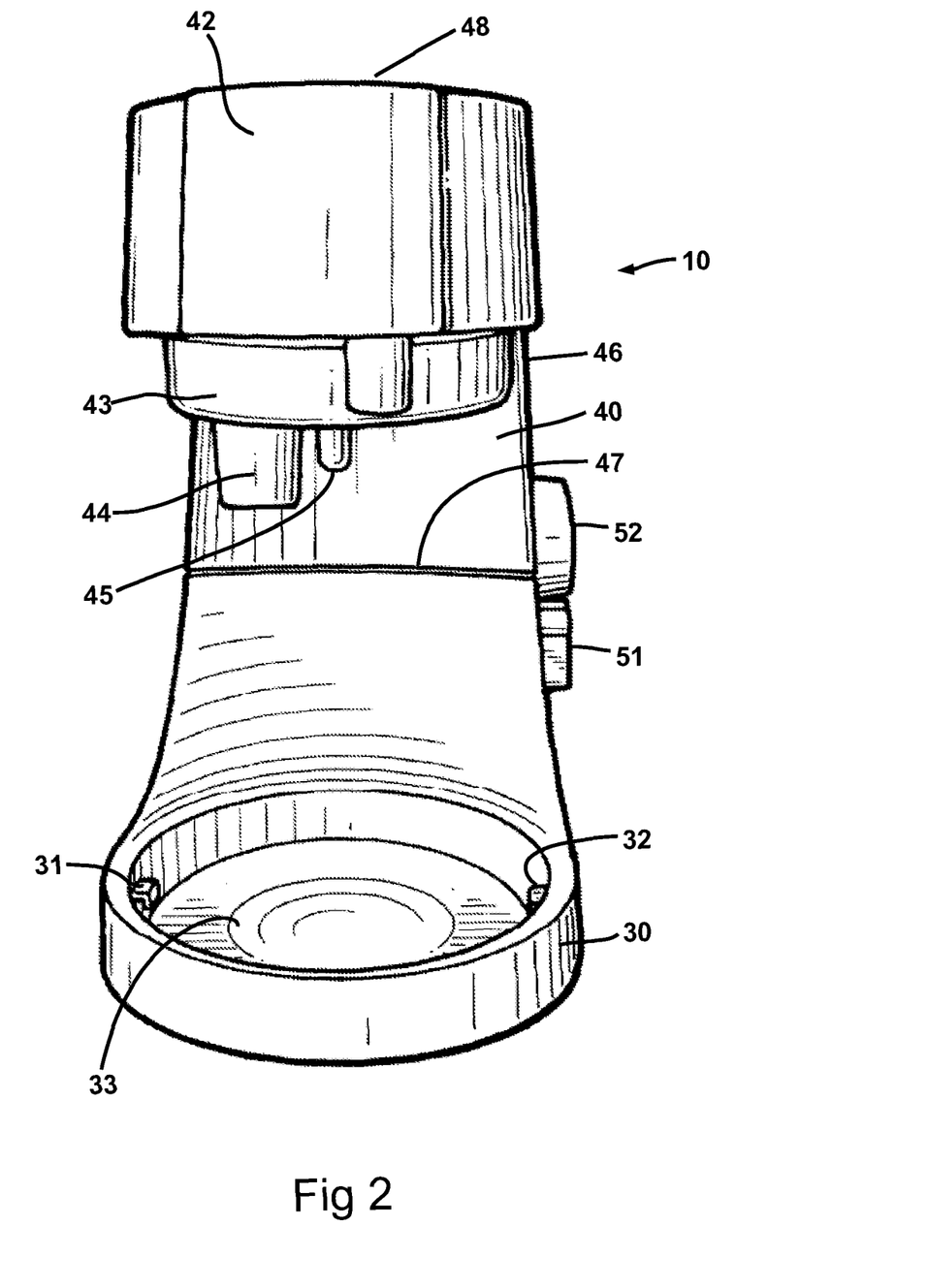
FIG. 2 shows the stand mixer of FIG. 1 from a frontal elevation.

Referring now to FIGS. 1 and 2, in which corresponding features carry the same reference numbers, a stand mixer 10 comprises a pedestal 20 which supports a bowl platform 30 and a housing 40. The housing 40 encloses, either in an upright casing part 46 or in a header unit 48, an electric drive motor and gearing (neither shown) which provides motive power to a plurality of drive outlets to which various tools can be attached to perform a wide variety of tasks in the kitchen.

In this particular example, there is provided a high-speed blender drive outlet behind covers 41, a slow-speed mincer drive outlet behind cover 42 and a planetary drive outlet 44, disposed beneath a gearbox casing 43; the planetary drive being intended for food mixing and thus being disposed overhead of the bowl location. It will readily be appreciated, however, that more, fewer and/or different drive outlets can be provided in accordance with desired functionality of the stand mixer.

A shanked mixing tool, attached as is conventional, to a socket comprised in the outlet 44, will depend in use into a mixing bowl placed on the bowl platform 30, and is configured to rotate about both the axis of the socket 44 and a central axis 45, thus performing a planetary mixing action. The necessary relationships between the relative shapes and dimensions of the bowl and the mixing tool to ensure thorough and repeatable mixing of ingredients are well known and established in use over many years.

As shown in FIGS. 1 and 2, the stand mixer 10 is, in this example, provided with a pair of latches 31, 32 within a recess 33 provided in the bowl platform 30, which latches co-operate with components on the base of the bowl to form a bayonet latching system which ensures firm and ready location of the bowl on its platform. Other latching systems, such as screw-threading for example, can be used as an alternative to bayonet latching if preferred.

The upright part 46 of the housing 40 is configured with a break line 47, to permit the header part 48 of the stand mixer to be hinged away from the platform 30 end of the pedestal part 20, in order to facilitate the insertion and removal of the mixing tools and the bowl.

The stand mixer 10 also incorporates electrical and mechanical user controls 51, 52 in conventional fashion.

In the pedestal 20, beneath the bowl platform 30, is provided a heating means (not shown) capable of generating sufficient heat to cook ingredients in the bowl. Typically, and indeed preferably, the bowl is of metal and the heating means comprises an inductive heater. Alternative or additional heating technologies can be employed, however, such as thick film heaters, halogen heaters and suitably configured sheathed resistance heaters.

If desired, the heating means may comprise relatively low and relatively high wattage settings, to enable the stand mixer arrangement to be used for slow cooking as well as for attended cooking programmes. It will be appreciated that, in such circumstances, the relatively low wattage setting may be provided by energising just a portion of a relatively high wattage heater element. Alternatively, the lower wattage may be provided by a separate element, or by cyclic interruption of the power to a single element.

In any event, the heating means typically has associated therewith a thermostat device and a thermal fuse (neither shown) which may communicate with the bowl in the manner described in our co-pending UK patent application No. GB0803325.0.

A first example of an arrangement in accordance with the present invention will now be described with additional reference to FIGS. 3 to 8, which show a two-component guarding device suitable for application to a stand mixer of the kind described with reference to FIGS. 1 and 2. It will be appreciated that, in use, a bowl 60 (see FIGS. 4, 7 and 8) is received in the stand mixer 10 with its base located in the recess 33 of the bowl platform 30. As previously mentioned, the base of the bowl 60 is formed with a diametrically opposed pair of shaped slots, respectively disposed and configured to co-operate with the latching elements 31, 32 of the stand mixer 10 to perform a bayonet latching function.

The bowl 60, or at least selected parts thereof, such as the base and lower wall area, may be constructed of a sandwich of materials in order to assist thermal transfer to the ingredients therein. For example, the whole or selected parts of the bowl may be multi-skinned, with inner and outer stainless steel walls and/or base, and an interlayer of aluminium therebetween.

Figure 3:
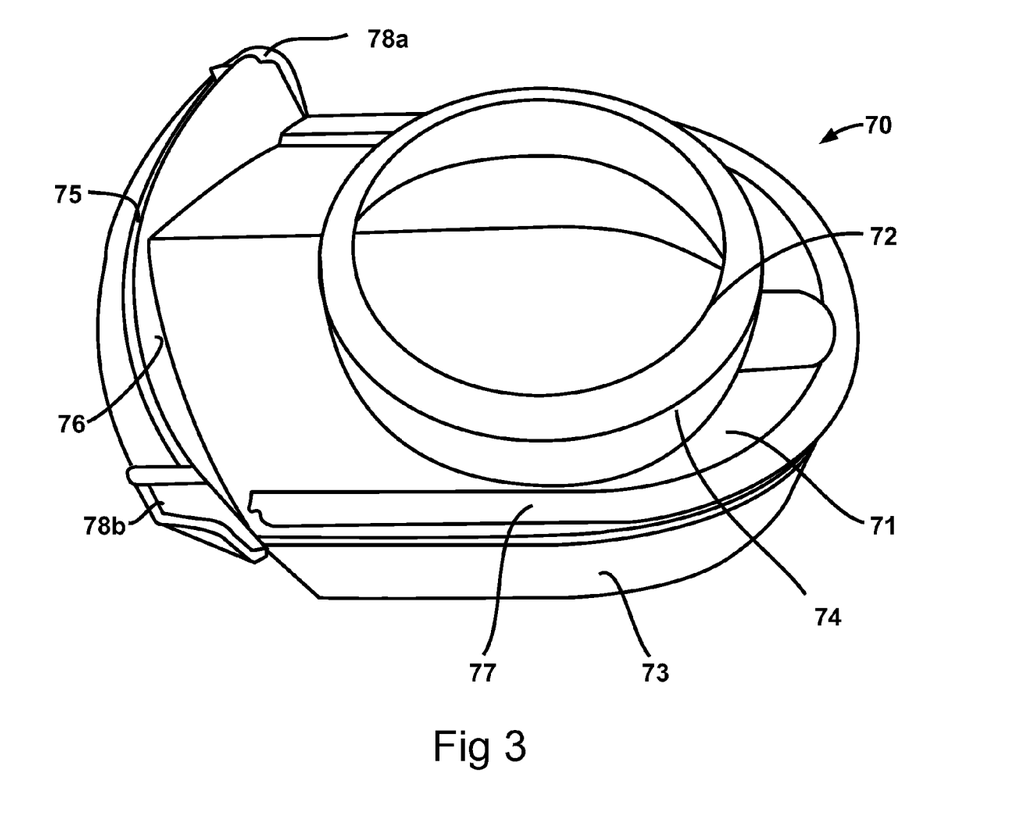
FIG. 3 shows, viewed on its underside, a heat guard formed as the first component of one example of an arrangement in accordance with the invention.

Referring now to FIG. 3, there is shown a view of a heat guard 70 which constitutes a first component of a guarding device for an arrangement in accordance with one example of the invention. In FIG. 3, the heat guard 70 is viewed on the side which, in use, would be its underside.

Figure 8:
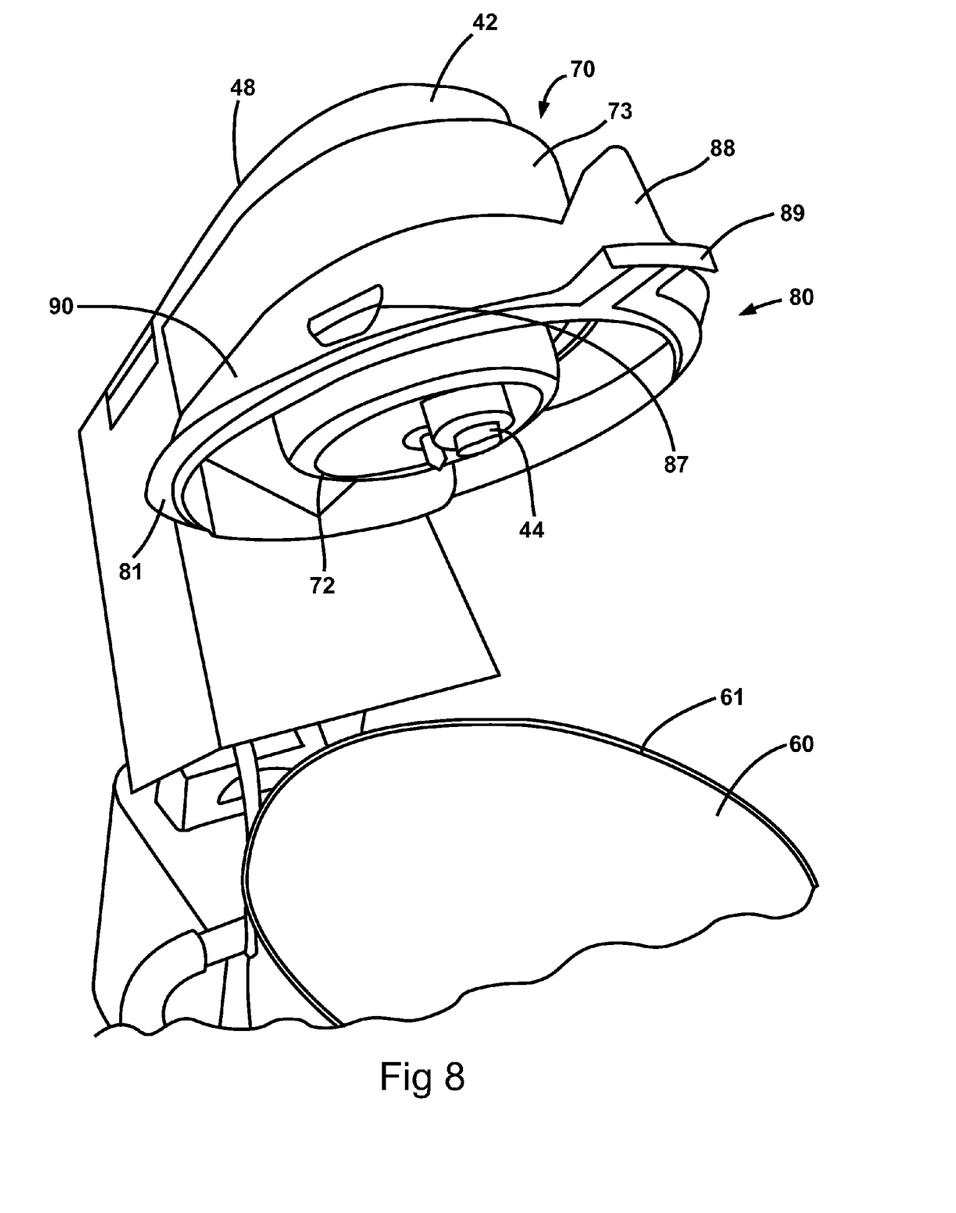
FIG. 8 shows both components of the arrangement of FIGS. 3 to 6 in situ on a stand mixer in the open position, ready to receive tools for stirring ingredients in the bowl of the stand mixer.

The heat guard 70 is typically moulded in transparent plastics material, such as polycarbonate, and comprises a body part 71 in which is formed an aperture 72 which is configured and contoured to provide an interference fit over the gearbox cover 43 of the stand mixer 10 shown in FIGS. 1 and 2, enabling the heat guard 70 to be firmly, but removably, attached to the stand mixer 10 merely by press-fitting the aperture 72 over the portion 43 of the stand mixer. As best seen in FIG. 8, the heat guard 70 surrounds the drive outlet 44. A flexible seal, such as a rubber seal, may be interposed between the inner wall of the aperture 72 and the outer surface of the gearbox cover portion 43 in order to resist the passage of steam through the contact region between the aperture wall and the gearbox cover portion. Alternatively, a self-supporting rubber ring may be attached to the body part 71 to constitute both the aperture and the seal.

The body part 71 further supports an upstanding, U-shaped wall 73 which overlies the front of the stand mixer and curves around the front of the head portion 48 of the stand mixer 10 to protect, from heat, condensation and the possible ingress of steam, the head portion 48 of the stand mixer 10, and the operational components, such as gearing components, housed therein.

The body part 71 is formed with further features to fulfil various functions, such as a relatively thin wall 74 around the aperture 72, this wall depending downwards in normal use and providing, together with an in-turned portion leading to the aperture 72 itself, and the aforementioned seal, the necessary resilience to provide the degree of firmness required of the interference fit between the aperture 72 and the gearbox casing 43 of the stand mixer 10. The rearwards-facing end of the body part 71 is formed with a lip 75 and an angled wall portion 76; the configuration of the lip 75 and the slope of the angled wall 76 being designed to encourage steam and condensate to return to the bowl 60.

The periphery of the body part 71 is provided with a press-fitted resilient sealing strip 77, which is removable for cleaning, but which is provided to form a seal between the heat guard 70 and a splash guard 80 (to be described in more detail hereinafter) which constitutes the second component of the guarding device provided in accordance with this embodiment of the invention.

Finally, the body part 71 is provided with latching features 78a and 78b to permit the aforesaid component 80 to be removably sealed and latched to the heat guard 70.

Figure 4:
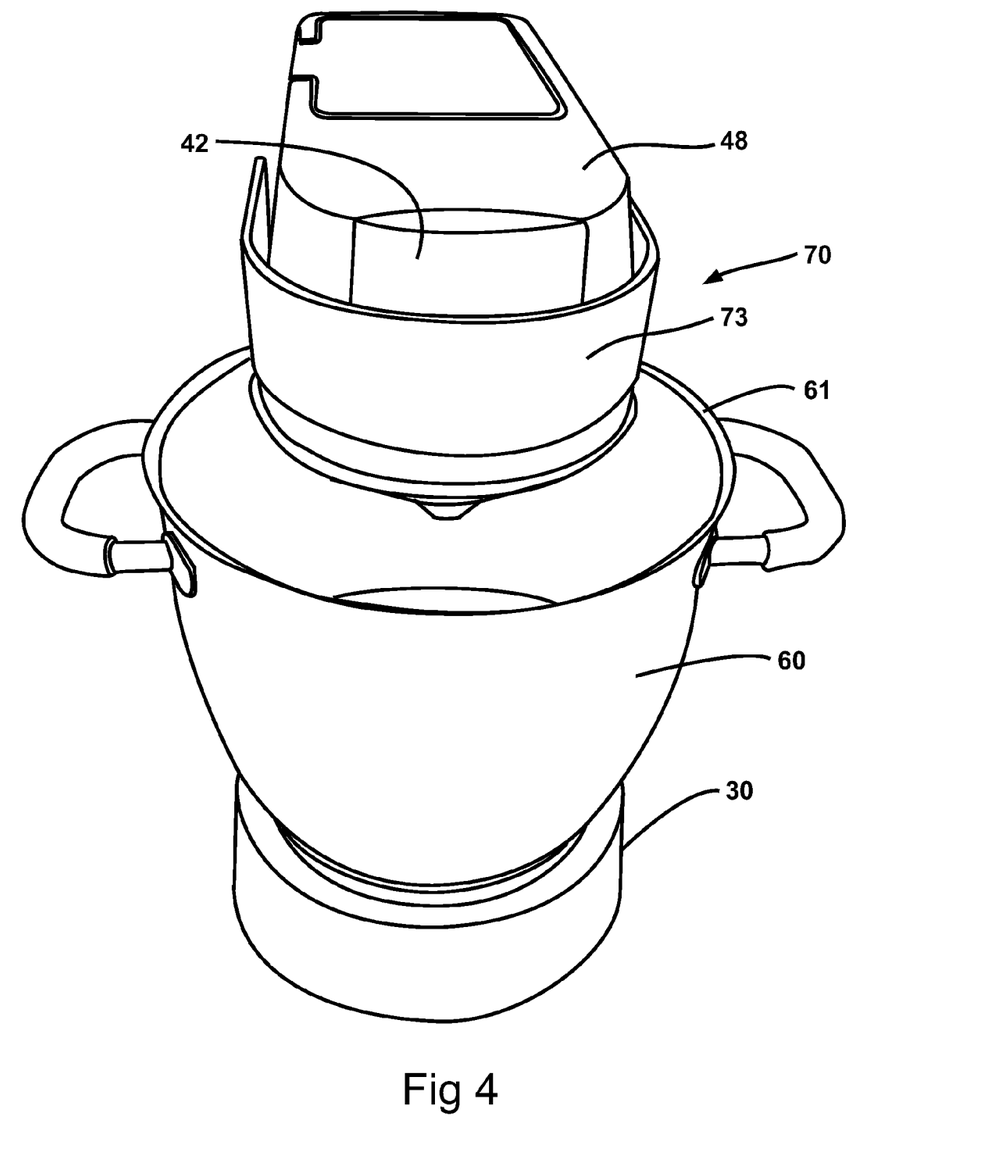
FIG. 4 shows the heat guard of FIG. 3 in situ on a stand mixer.

FIG. 4 shows the heat guard 70 in situ, as for operation, on the stand mixer 10. It will be appreciated that, if desired, the heat guard 70 can be used alone (i.e. without the splash guard 80) and FIG. 4 shows that, with the first component (heat guard 70) in place, sufficient room is provided for steam to escape easily from the bowl 60. Moreover, ready access to the bowl 60, for example to add ingredients, is afforded when just the heat guard 70 is employed.

Although the entire range of operations of which the stand mixer 10 is capable, other than the heating function, can safely be used without the heat guard 70 in place, it is not recommended that any operation requiring the heating function is employed without the heat guard 70 in place. Accordingly, this embodiment of the invention provides a safety interlock which disables the heater unless the heat guard 70 is properly in place upon the stand mixer 10. In this example, the interlock is provided by a magnetically operated reed switch (not shown) in the head portion 48 of the stand mixer 10; the switch responding to the presence of a magnet 79 (see FIG. 5a) secured in any convenient manner to the body part 71. The reed switch is used in known manner, either directly or indirectly, to interrupt the supply of electrical power to the heater unless the proximity of the magnet 79 is sensed thereby.

Figure 5A:
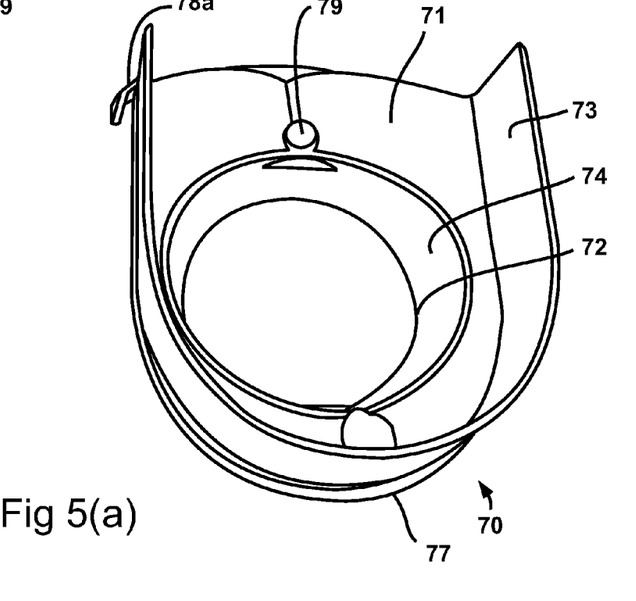
FIG. 5a shows the heat guard of FIGS. 3 and 4.
Figure 5B:
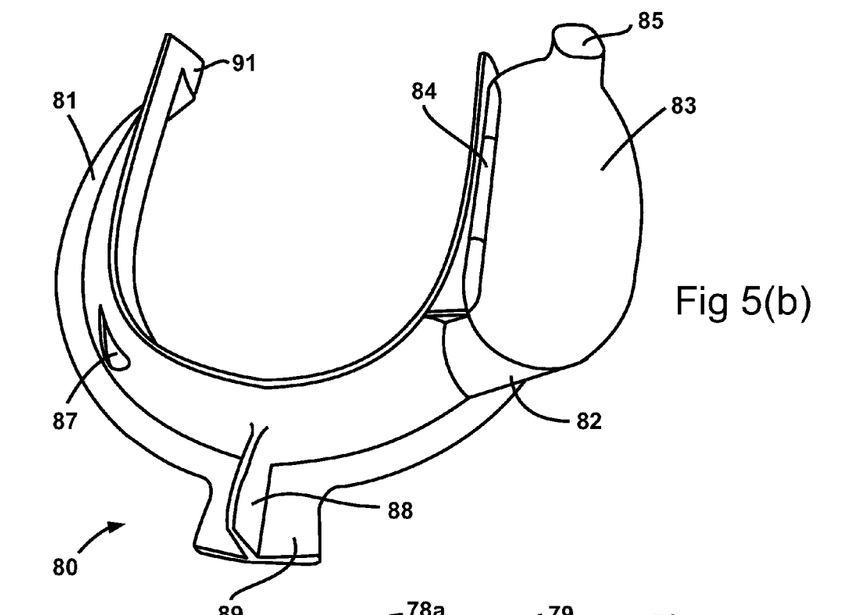
FIG. 5b shows a splash guard formed as the second component of one example of an arrangement in accordance with the invention; both components being viewed from above.
Figure 6:
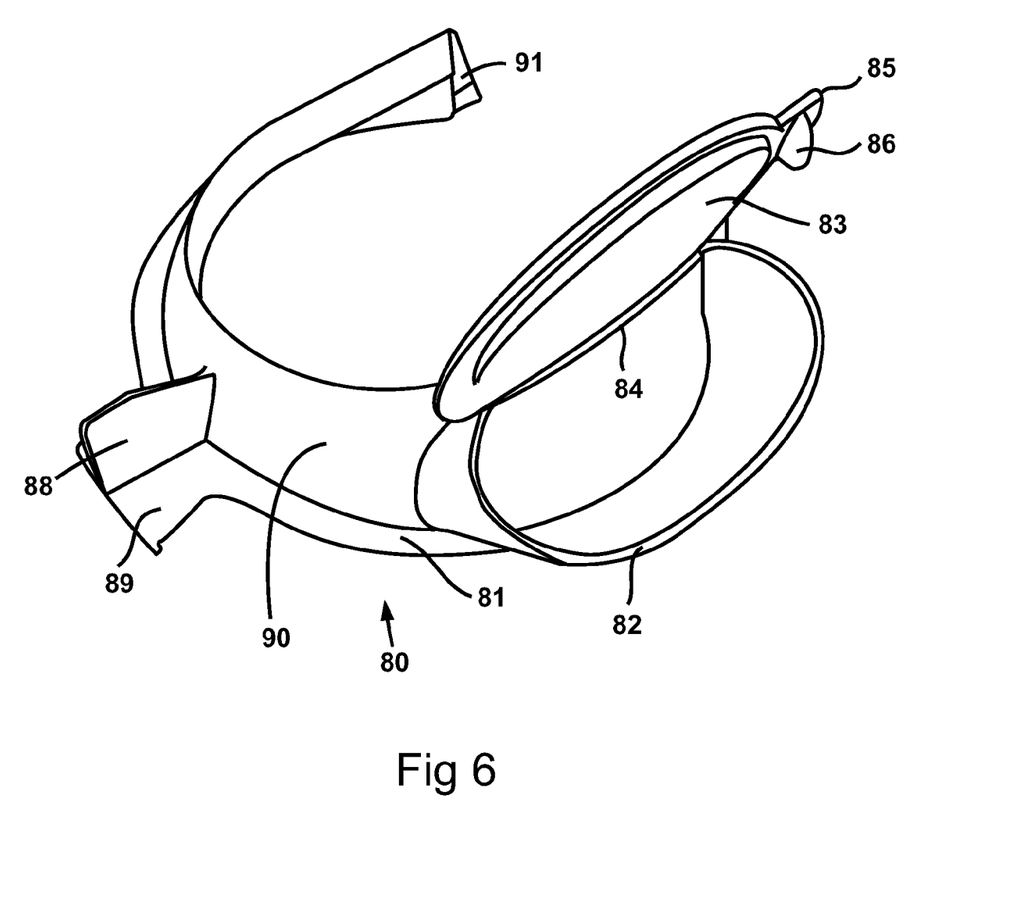
FIG. 6 shows the splash guard of FIG. 5b from above.

FIGS. 5b and 6 show the splash guard 80 which, as aforesaid, is designed to fit to the heat guard 70 and which constitutes the second component of the guarding device provided in accordance with this example of the invention.

The splash guard 80 is generally U-shaped, and typically formed of transparent plastics material, such as polycarbonate, and it is also formed with further features to fulfil various functions, such as a relatively flat rim portion 81 which is designed in use to sit upon the upper rim 61 of the bowl 60 to prevent ingredients being ejected from the bowl during the various cooking or cooking and stirring processes of which the stand mixer 10 is capable.

The splash guard 80 is also formed with a chute 82 which provides a generous opening to permit the addition of reasonably bulky ingredients during a cooking process; the chute 82 having associated therewith a cover or lid 83 which is hinged at 84 to the body of the splash guard 80. The lid 83 can be raised by means of a handle 85, which has a protective projection 86 strategically placed relative thereto and dimensioned to protect the user from steam issuing from the chute 82. There may also be a steam exit vent 87 provided on the opposite side of the splash guard 80 to the chute 82, though the provision of this vent is optional and it may thus be omitted if desired or preferred.

The splash guard itself can be manipulated by means of a fixed handle 88 which has a steam shield 89 associated therewith. The chute 82 is formed in an angled wall 90, the angular disposition of which is designed to encourage condensate to return to the bowl 60. The shape of the steam exit vent 87, if provided, is also configured to encourage condensate to run back inside the bowl.

Figure 7:
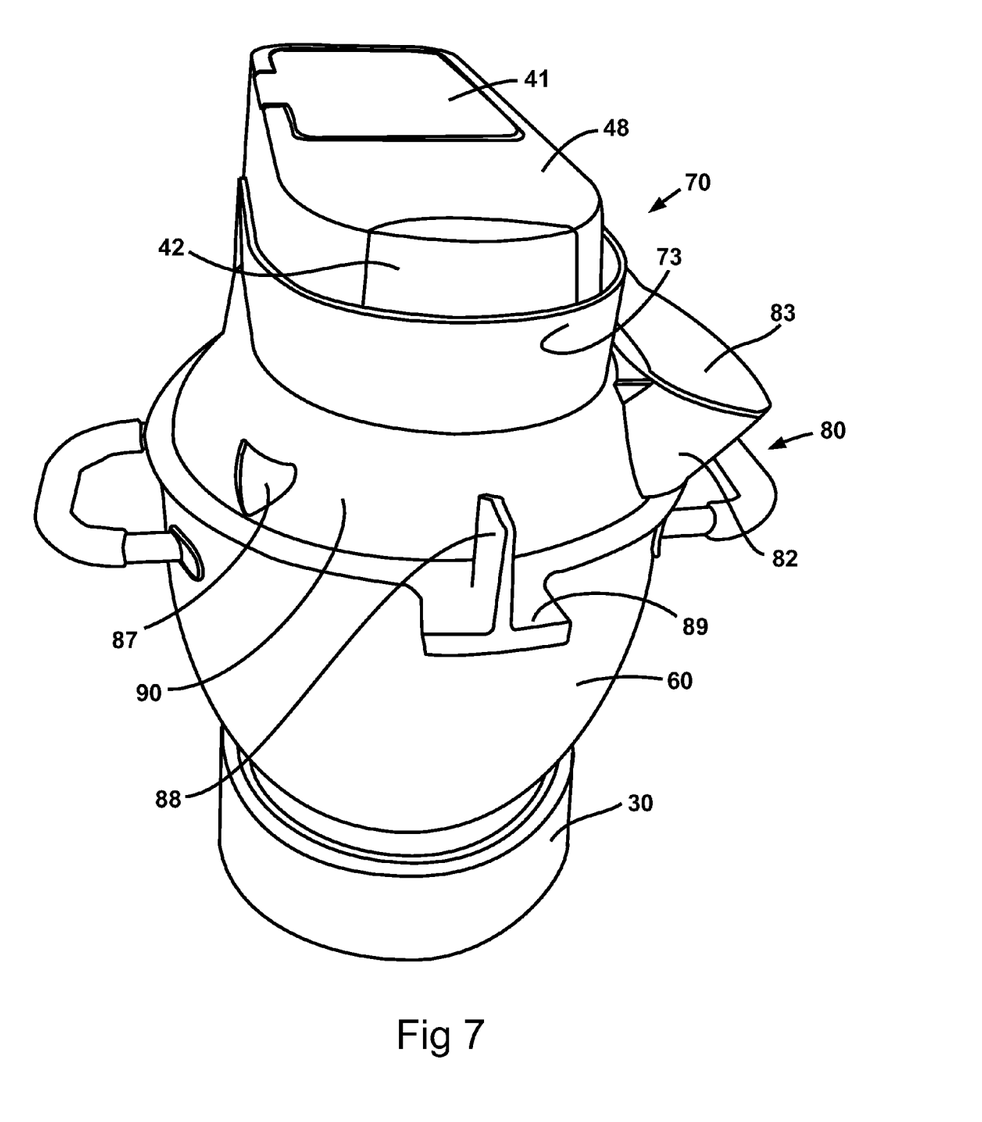
FIG. 7 shows both components of the arrangement of FIGS. 3 to 6 in situ on a stand mixer in the closed position, ready for use.

At the remote ends of the arms of its U-shaped form, the splash guard 80 is provided with features such as those shown at 91, designed to engage and interfit with the latching features 78a and 78b formed on the body part 71 of the heat guard 70, thereby temporarily latching the first and second components 70 and 80 together, with the sealing strip 77 between them for use, as shown in FIGS. 7 and 8.

In general it will be appreciated that the problem addressed by the present invention is that conventional (1-piece) splashguards do not provide the user with adequate control over the steam and condensation produced when used with a cooking stand mixer. In particular, conventional 1-piece splashguards do not adequately protect the stand mixer from steam and condensation.

In addressing this overall problem, it will be appreciated that a number of individual issues are specifically addressed. For example, the heat guard 70 protects the stand mixer 10 from the heat and moisture associated with steam rising from the bowl 60 which then condenses on the relatively cool stand mixer parts. Further, the heat guard 70 is interlocked, for example via the magnet 79 and associated reed-switch, to ensure that it is always fitted when any heating function is selected by the user. The magnet 79 can conveniently be retained within a cavity in the body part 71 by an elastomeric seal and ultrasonically welded plug.

In addition, the heat guard 70 is shaped and configured to encourage condensation to return to the bowl 60 and allows the user to manually wipe away excess condensation as required (when the splash guard 80 is not fitted). This significantly reduces the amount of condensation deposited outside the bowl 60 when the head of the stand mixer 10 is lifted. The heat guard 70 is retained onto the gearbox casing 43 of the stand mixer's gearbox by a press fit engagement, as with conventional splash guards, and is preferably sealed as described above.

Further, the heat guard 70 houses a press-fit retained elastomeric seal 77, which provides a seal against the splash guard 80 when fitted, and is removable for cleaning. Further features on the heat guard 70 provide for simple latching to retain the splash guard.

The heat guard 70 may be used with or without the splash guard 80. When used with the splash guard 80, this is analogous to a saucepan being used with the lid. When used without the splash guard 80, this is analogous to a saucepan being used without the lid.

The splash guard 80 is used only when the heat guard 70 is also fitted. The shape of the splash guard 80 encourages condensation to return to the bowl 60. It incorporates a feed chute 82 with generous opening, a hinged latching feed chute lid 83 and features (89, 86) for protecting the user from hot steam when using handles (88 and 85) provided on the splash guard 80 and the chute lid 83 respectively. It also optionally contains the vent 87 which, if provided, is shaped to encourage condensation to return to the bowl 60. The chute hinge 84 is designed to encourage condensation to return to the bowl 60.

The main components 70 and 80 are typically fabricated by injection moulding with transparent colourless polycarbonate. The main seal, and magnet seal, are typically manufactured from silicone rubber.

Where both components 70 and 80 are used together, it may be preferred, as shown in FIG. 8, to so arrange the latching between them that the two components are retained together as the header unit 48 is raised away from the bowl platform 30. Alternatively, however, it may be preferred to arrange that the splash guard 80 remains attached to the bowl 60 and that just the heat guard 70 is raised with the header unit 48.

The invention claimed is:

1. A stand mixer arrangement including a platform to support a mixing bowl; an electric motor and a drive system including a drive outlet disposed overhead of the bowl, capable of imparting a planetary mixing action to a tool suspended into the bowl therefrom; and heating means provided to permit, in accordance with user selection, ingredients in the bowl to be heated whilst being subjected to the planetary mixing action; the arrangement further including a guarding device for said bowl and wherein the guarding device comprises a first component removably attachable to the stand mixer disposed overhead of the bowl in the vicinity of and surrounding said drive outlet and a second component removably attachable to the first component; said first component being adapted to shield a part of the stand mixer which is overhead of the bowl from heat rising from the bowl and said second component being adapted to resist unwanted egress of steam and/or to prevent ingredients being ejected from the bowl.

2. An arrangement according to claim 1, wherein the said components are configured such that just the first component is usable alone as a heat shield, leaving the bowl open so that steam can escape therefrom, or together with the second component, in order to cover the bowl.

3. An arrangement according to claim 1, wherein the first component is shaped and dimensioned to provide an interference fit to a downwardly-dependant part of the stand mixer overlying the bowl.

4. An arrangement according to claim 3 wherein said interference fit is augmented by a resilient seal resistive to the passage of steam.

5. An arrangement according to claim 1, wherein attachment surfaces of the first and second components are separated by a seal carried by the first component.

6. An arrangement according to claim 1, wherein the surface of the second component exposed to the bowl is configured to encourage condensate to flow back into the bowl.

7. An arrangement according to claim 1, wherein the bowl is made of metal.

8. An arrangement according to claim 7, wherein the bowl, or at least some part or parts thereof, is constructed of a sandwich of materials in order to assist thermal transfer to the ingredients therein.

9. An arrangement according to claim 8, wherein said part at least of the bowl is constructed with inner and outer stainless steel walls with an interlayer of aluminum therebetween.

10. A stand mixer arrangement including a platform to support a mixing bowl; an electric motor and a drive system including a drive outlet disposed overhead of the bowl, capable of imparting a planetary mixing action to a tool suspended into the bowl therefrom; and heating means provided to permit, in accordance with user selection, ingredients in the bowl to be heated whilst being subjected to the planetary mixing action; the arrangement further including a guarding device for said bowl and wherein the guarding device comprises a first component removably attachable to the stand mixer in the vicinity of said drive outlet and a second component removably attachable to the first component; said first component being adapted to shield part of the stand mixer from heat and said second component being adapted to resist unwanted egress of steam and/or to prevent ingredients being ejected from the bowl, wherein the second component is provided with a closable aperture through which ingredients may be added without the need to remove the second component from the bowl.

11. A stand mixer arrangement including a platform to support a mixing bowl; an electric motor and a drive system including a drive outlet disposed overhead of the bowl, capable of imparting a planetary mixing action to a tool suspended into the bowl therefrom; and heating means provided to permit, in accordance with user selection, ingredients in the bowl to be heated whilst being subjected to the planetary mixing action; the arrangement further including a guarding device for said bowl and wherein the guarding device comprises a first component removably attachable to the stand mixer in the vicinity of said drive outlet and a second component removably attachable to the first component; said first component being adapted to shield part of the stand mixer from heat and said second component being adapted to resist unwanted egress of steam and/or to prevent ingredients being ejected from the bowl, further comprising an interlock connected such that the heating means is not energisable unless at least the first component of the guarding device is in place on the stand mixer.

* * * * *